US010838436B2

(12) United States Patent
Phillips et al.

(10) Patent No.: US 10,838,436 B2
(45) Date of Patent: Nov. 17, 2020

(54) AUTOMATIC FILL CONTROL TECHNIQUE (71) Applicant: Flow Control LLC., Beverly, MA (US)

(72) Inventors: David L. Phillips, Groveland, MA (US); Jesus Estrada, Gloucester, MA (US)

(73) Assignee: FLOW CONTROL LLC, Beverly, MA (US)

( * ) Notice: Subject to any disclaimer, the term of this patent is extended or adjusted under 35 U.S.C. 154(b) by 0 days.

(21) Appl. No.: 14/827,430

(22) Filed: Aug. 17, 2015

(65) Prior Publication Data
US 2016/0048137 A1 Feb. 18, 2016

Related U.S. Application Data (60) Provisional application No. 62/037,761, filed on Aug. 15, 2014.

(51) Int. Cl.
*G05D 9/12* (2006.01)
*G05D 7/06* (2006.01)
*G05D 9/00* (2006.01)

(52) U.S. Cl.
CPC .......... *G05D 9/12* (2013.01); *G05D 7/06* (2013.01); *G05D 7/0623* (2013.01); *G05D 9/00* (2013.01)

(58) Field of Classification Search
CPC ......... Y10T 137/7306; Y10T 137/7287; Y10T 137/7297; Y10T 137/729; G05D 7/00;
(Continued)

(56) References Cited

U.S. PATENT DOCUMENTS 4,331,262 A * 5/1982 Snyder ................. B65B 7/2807
141/196
5,062,555 A * 11/1991 Whigham ............ B67D 1/0037
137/624.12
(Continued)

FOREIGN PATENT DOCUMENTS

CN     101374443 A     2/2009
CN     201548288 U     8/2010
(Continued)

OTHER PUBLICATIONS

Authors(s) : Ejiofor et al., Tamilnadu, India See Ejiofor and Oladipo, "Microcontroller based Automatic Water level Control System," ISSN (Online) 2320-9801 ISSN (Print): 2320-9798 International Journal of Innovative Research in Computer and Communication Engineering (An ISO 3297: 2007 Certified Organization) vol. 1, Issue 6, Aug. 2013 Copyright to IJIRCCE www.ijircce.com 1390.
(Continued)

*Primary Examiner* — Hailey K. Do
(74) *Attorney, Agent, or Firm* — Ware, Fressola, Maguire & Barber LLP

(57) ABSTRACT

A pump includes a signal processor that receives signaling containing information about a low level of a liquid sensed in an appliance reservoir to be supplied to an appliance that uses the liquid to dispense a flavored beverage, and also about when the appliance reservoir is refilled based upon an indication that forms part of an appliance reservoir refill level calibration procedure programmed by an appliance user; and determines corresponding signaling containing information about automatically refilling the liquid in the appliance reservoir, based upon the signaling received.

20 Claims, 5 Drawing Sheets

Refill pump block diagram

Refill pump flowchart (58) Field of Classification Search
CPC ...... G05D 7/06; G05D 7/0617; G05D 7/0623; G05D 9/00; G05D 9/02; G05D 9/04; G05D 9/12
USPC .... 137/565.01, 565.11, 565.17, 565.34, 386, 137/389, 392, 387
See application file for complete search history.

(56) References Cited

U.S. PATENT DOCUMENTS

| | | | |
|---|---|---|---|
| 5,173,033 A * | 12/1992 | Adahan | F04B 17/06 137/854 |
| 5,195,422 A | 3/1993 | Newnan | |
| 5,316,181 A | 5/1994 | Burch | |
| 5,375,508 A * | 12/1994 | Knepler et al. | A47J 31/0576 219/483 |
| 5,417,145 A | 5/1995 | Joseph et al. | |
| 5,647,055 A | 7/1997 | Knepler | |
| 6,003,435 A | 12/1999 | Patel | |
| 6,588,632 B1 * | 7/2003 | Nicol | B67D 1/0006 222/52 |
| 6,617,845 B1 * | 9/2003 | Shafiyan-Rad | G01D 11/245 219/124.4 |
| 6,799,471 B1 * | 10/2004 | Regimand | G01N 3/36 137/386 |
| 7,360,418 B2 | 4/2008 | Pelovitz | |
| 7,398,726 B2 | 7/2008 | Streeter et al. | |
| 7,503,253 B2 | 3/2009 | Rahn | |
| 8,037,811 B2 | 10/2011 | Bunn | |
| 8,075,935 B2 | 12/2011 | Kreutzer Orent et al. | |
| 8,327,753 B2 | 12/2012 | White et al. | |
| 8,338,811 B2 | 12/2012 | Lang et al. | |
| 8,760,302 B1 | 6/2014 | MacDonald | |
| 8,790,513 B1 | 7/2014 | Boulter | |
| 2004/0183693 A1 * | 9/2004 | Hart | A47J 31/007 340/870.11 |
| 2005/0178792 A1 * | 8/2005 | Knepler | A47J 31/56 222/1 |
| 2006/0292012 A1 | 12/2006 | Brudevold et al. | |
| 2009/0148306 A1 | 6/2009 | Drechsel et al. | |
| 2009/0229683 A1 * | 9/2009 | Baek | G01F 23/263 137/386 |
| 2009/0235826 A1 | 9/2009 | Hart et al. | |
| 2010/0154534 A1 | 6/2010 | Hampton | |
| 2010/0303983 A1 | 12/2010 | Rodriguez et al. | |
| 2011/0265562 A1 | 11/2011 | Li | |
| 2012/0152374 A1 * | 6/2012 | Hymes | A01K 7/02 137/392 |
| 2013/0174916 A1 * | 7/2013 | Hampton | G01F 23/265 137/2 |
| 2013/0297235 A1 | 11/2013 | Oldfield et al. | |
| 2014/0069353 A1 | 3/2014 | Jimenez | |
| 2014/0144932 A1 | 5/2014 | Doelman et al. | |
| 2014/0202180 A1 * | 7/2014 | Beuligman | F25C 1/225 62/66 |
| 2015/0041005 A1 * | 2/2015 | Orita | B67D 1/0004 137/565.11 |

FOREIGN PATENT DOCUMENTS

| | | | | |
|---|---|---|---|---|
| WO | 2011051707 | | 5/2011 | |
| WO | WO 2013128667 A1 * | | 9/2013 | ........... B67D 1/0004 |
| WO | WO 2015094327 A1 * | | 6/2015 | ............... C09K 8/62 |

OTHER PUBLICATIONS

Author(s) : Agarwal, Tarun, See Tarun Agarwal, "Simple Water Level Controller Circuit with Microcontroller and Alarm," May 5, 2014 Electronics | Projects | Focus http://www.elprocus.com/simple-water-level-controller-using-microcontroller/, which discloses a DIY project for building various water level pump controllers. [online] [retrieved 2014-0816].

See Reza et al, "Microcontroller Based Automated Water Level Sensing and Controlling: Design and Implementation Issue," Proceedings of the World Congress on Engineering and Computer Science 2010 vol. I WCECS 2010, Oct. 20-22, 2010, San Francisco, USA ISBN: 978-988-17012-0-6 ISSN: 2078-0958 (Print); ISSN: 2078-0966 (Online).

Author(s) : Mashud et al. See Mashud, M. A. A., et al. "Microcontroller Based Single Phase Water-Pump Controller." International Journal of Information 2.4 (2012). http://airccse.org/journal/IS/papers/2412ijist05.pdf, which discloses a microcircuit built to control a single phase water-pump with sound stability, operation speed and accuracy, and with sufficiently quick upper and lower level responses (Figure 3 on the 5th Page).

Ranjan et al. See "Water level controller using 8051," Circuits Today Aug. 7, 2012 http://www.circuitstoday.com/water-level-controller-using-8051, which discloses programming an 8051 PLC to control pump using level sensor probes in an overhead tank (pp. 1-3). [online] [retrieved Aug. 16, 2014].

English language Abstract of CN101374443.
English language Abstract of CN201548288.

* cited by examiner

Figure 1: Refill pump block diagram

Figure 2: Refill pump flowchart

Figure 3: Calibration Procedure

Figure 4A: Pump Version

Figure 4B: Solenoid Version

Apparatus 10

Signal processor, microcontroller, or signal processing module 10a, including one forming part of a printed circuit board assembly (PCBA), configured at least to:

receive signaling containing information about a low level of a liquid sensed in an appliance reservoir to be supplied to an appliance that uses the liquid to dispense a flavored beverage, and also about when the appliance reservoir is refilled based upon an indication that forms part of an appliance reservoir refill level calibration procedure programmed by an appliance user; and determine corresponding signaling containing information about automatically refilling the liquid in the appliance reservoir, based upon the signaling received.

Other signal processor circuits or components 10b that do not form part of the underlying invention, e.g., including input/output modules, one or more memory modules, data, address and control busing architecture, etc.

Figure 5

AUTOMATIC FILL CONTROL TECHNIQUE

CROSS-REFERENCE TO RELATED APPLICATIONS

This application claims benefit to provisional patent application Ser. No. 62/037,761, filed 15 Aug. 2014, which is incorporated by reference in their entirety.

BACKGROUND OF THE INVENTION

1. Field of Invention

The present invention relates to a pump control technique; and more particularly to a pump control technique related to an automatic fill of a reservoir, e.g., for an appliance.

2. Description of Related Art

Devices or units that are known in the art and out in the field utilize pressure to shut a pump off when not in use. This means that the supplied appliance must have a solenoid valve installed to shut off the flow of water to the appliance. Upon the appliance shutting the solenoid valve, the pressure builds up and the unit shuts off. When the pressure is relieved the pump begins to pumps again. These units also are typically in contact with the water in the reservoir to determine the low level and when to start the refill process.

One problem with the known technique used in the abovementioned devices, is that they maintain pressure in the lines to keep the pump shutdown. If the lines burst the pump pumps until the supply is depleted. In view of this, there is a need in the industry for a better way to shut a pump off when not in use.

SUMMARY OF THE INVENTION

Examples of Particular Embodiments

According to some embodiments, and by way of example, the present invention may include, or take the form of, apparatus featuring a signal processor, microcontroller, or signal processing module configured at least to:
 receive signaling containing information about a low level of a liquid sensed in an appliance reservoir to be supplied to an appliance that uses the liquid to dispense a flavored beverage, and also about when the appliance reservoir is refilled based upon an indication that forms part of an appliance reservoir refill level calibration procedure programmed by an appliance user; and
 determine corresponding signaling containing information about automatically refilling the liquid in the appliance reservoir, based upon the signaling received.

By way of example, the apparatus may include one or more of the following features:

The signal processor, microcontroller or signal processing module may be configured to:
 respond to associated signaling containing information about a subsequent low level of the liquid sensed in the appliance reservoir to be supplied to the appliance, and provide the corresponding signaling containing information about automatically refilling the liquid in the appliance reservoir.

The indication that forms part of the appliance reservoir refill level calibration procedure implemented by the appliance user may take the form of a user input (e.g., to the appliance and the control PCB, including providing the user input (e.g., pressing an appliance button) in response to visually seeing and determining that the appliance reservoir is refilled.

The indication that forms part of the appliance reservoir refill level calibration procedure implemented by the appliance user may take the form of a user input (e.g., pressing an appliance button like the ON/OFF button or a specific calibration control button), e.g., to the appliance and the control PCB, for providing high level sensor signaling containing information that the appliance reservoir is refilled.

The signal processor, microcontroller or signal processing module may be configured to respond to the indication and determine an amount of time required for refilling the appliance reservoir.

The apparatus may include, or take the form of, automatic refilling equipment having either a combination of a refill pump and reservoir, or a solenoid coupled to a water mains, the automatic refilling equipment being configured with the signal processor, microcontroller, or signal processing module to respond to the corresponding signaling, and to provide the liquid to refill the appliance reservoir.

The apparatus may include a low level sensor configured to sense the low level of the liquid in the appliance reservoir to be supplied to the appliance, and provide the signaling to be received by the signal processor, microcontroller, or signal processing module, including where the low level sensor is configured using capacitive-based sensing that is not in contact with the liquid in the appliance reservoir.

The low level sensor may include a level sensing printed circuit board (PCB) or printed circuit board assembly (PCBA).

The signal processor, microcontroller, or signal processing module may include, or take the form of, a control printed circuit board (PCB) that forms part of a refill pump, as well as a refill pump having the control PCB with the signal processor, microcontroller, or signal processing module.

The apparatus may include, or take the form of, a programmable refill pump having a motor, a pump head and control printed circuit board having the signal processor, microcontroller, or signal processing module for implementing signal processing functionality of the programmable refill pump.

The apparatus may include the appliance reservoir configured with low and high level sensors for sensing a liquid level and providing low and high level sensor signaling containing information about the same.

The signal processor, microcontroller, or signal processing module may be configured to implement the appliance reservoir refill level calibration procedure by:
 running a pump and draining the appliance reservoir until the low level of the liquid is sensed in the appliance reservoir;
 running the pump and providing the liquid from a main reservoir to the appliance reservoir until a high level of the liquid is sensed in the appliance reservoir;
 determining the amount of time to refill the liquid in the appliance reservoir; and
 storing the amount of time to refill the liquid in the appliance reservoir, including where the amount of time is stored in a non-volatile memory on a control printed circuit board (PCB).

The signal processor, microcontroller, or signal processing module may be configured to implement a timeout feature in order to prevent overfilling of the appliance reservoir when refilled.

The apparatus may include a combination of the pump, the appliance reservoir, and low and high level liquid sensors arranged on the appliance reservoir.

The appliance may be a fluid dispenser for dispensing a flavored beverage, such as tea, coffee or juice.

The Method

According to some embodiments, the present invention may take the form of a method featuring steps for: receiving with a signal processor, microcontroller, or signal processing module signaling containing information about a low level of a liquid sensed in an appliance reservoir to be supplied to an appliance that uses the liquid to dispense a flavored beverage, and also about when the appliance reservoir is refilled based upon an indication that forms part of an appliance reservoir refill level calibration procedure programmed by an appliance user; and determining with the signal processor, microcontroller, or signal processing module corresponding signaling containing information about automatically refilling the liquid in the appliance reservoir, based upon the signaling received.

The method may includes steps for implementing one or more of the other features set forth herein.

In operation, the present invention may be configured to do one or more of the following:
Utilize level sensing technology coupled with a microcontroller to determine the level of water needed to refill; and
Eliminate the need or requirement for the unit to be under pressure to relieve the pressure.

In view of this, the present invention overcomes the aforementioned problems in the art, as follows:
By utilizing level sensing method that is calibrated by the user, the present invention may be implemented to store the time required for the filling into non-volatile memory on the PCBA;
The calibration method may be coupled with a low level sensor, either capacitive or other means that is not in contact with the water;
The present invention can be configured to utilize one low level sensor to turn the pump on, or to utilize a high level and low level sensors to provide extra levels of safety;
Safety features to prevent the overfilling include a timeout feature, that should the pump continue to run there would be a time delay then shut off past the original fill amount.

BRIEF DESCRIPTION OF THE DRAWING

The drawing includes FIGS. 1-5, which are not necessarily drawn to scale, which are briefly described as follows.

Not every element in every Figure is labeled with a lead line and reference numeral, so as to reduce clutter in the drawing.

DETAILED DESCRIPTION OF BEST MODE OF THE INVENTION

Figure 1:
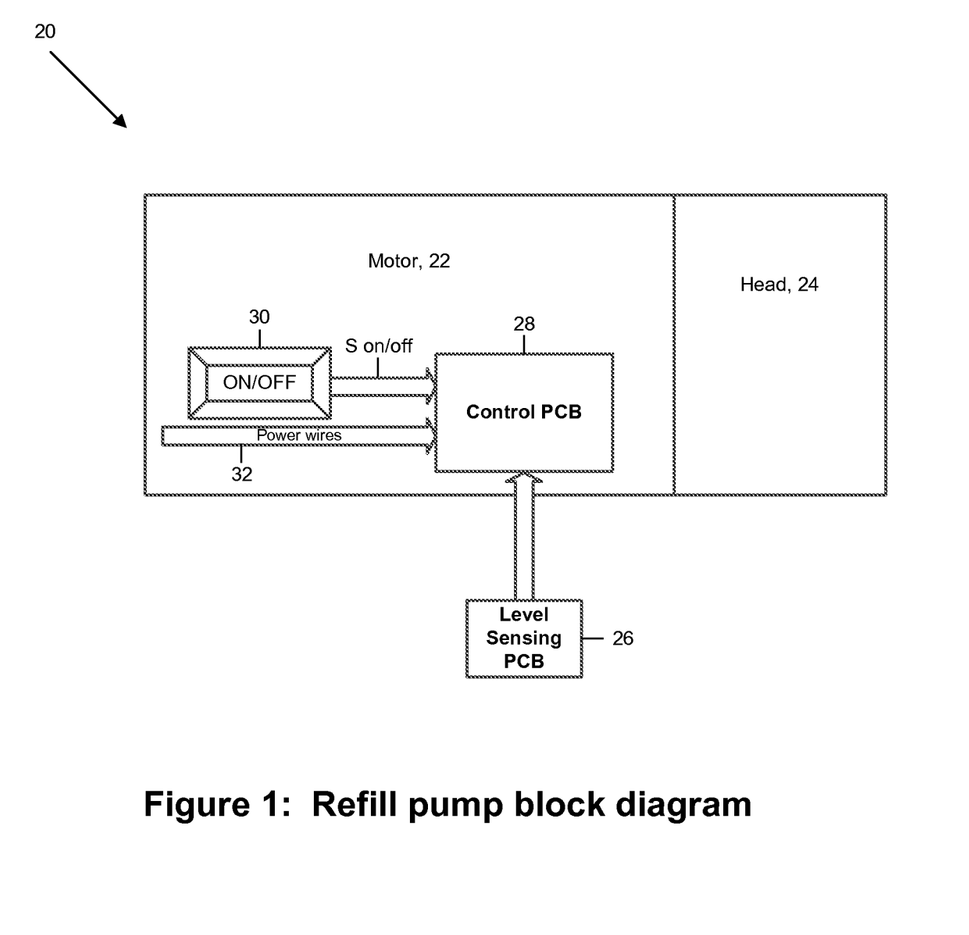
FIG. 1 is a block diagram of apparatus to implement functionality related to a refill pump, according to some embodiments of the present invention.

FIG. 1: The Basic System

By way of example, FIG. 1 shows apparatus generally indicated as 20, which may take the form of a pump 20, having a control PCB 28 to implement functionality related to a refill pump, according to some embodiments of the present invention. The pump 20 may include a pump motor 22 and a pump head 24. The pump motor 22 may include the control PCB 28, an ON/OFF switch 30, and power wires 32 to receive power. In FIG. 1, the control PCB 26 is shown coupled to the level sensing PCB 26, which may include, or take the form of elements 108 (FIG. 4A or 208 (FIG. 4B), e.g., consistent with that set forth below.

During normal operation, the control PCB 28 may be configured to receive signaling from the level sensing PCB 26 containing information about a low level of a liquid sensed in an appliance reservoir (e.g., elements 106 (FIG. 4A) or 206 (FIG. 4B) to be supplied to an appliance (e.g., such as a coffee machine or soda or juice dispenser) that uses the liquid to dispense a flavored beverage (e.g., tea, coffee, juice or soda); and to determine corresponding signaling containing information about automatically refilling the liquid in the appliance reservoir, based upon the signaling received. The corresponding signaling may include, or take the form of, controlling the pump 20 in order to refill the appliance reservoir. For example, the corresponding signal may include turning ON/OFF the motor 22.

Figure 2:
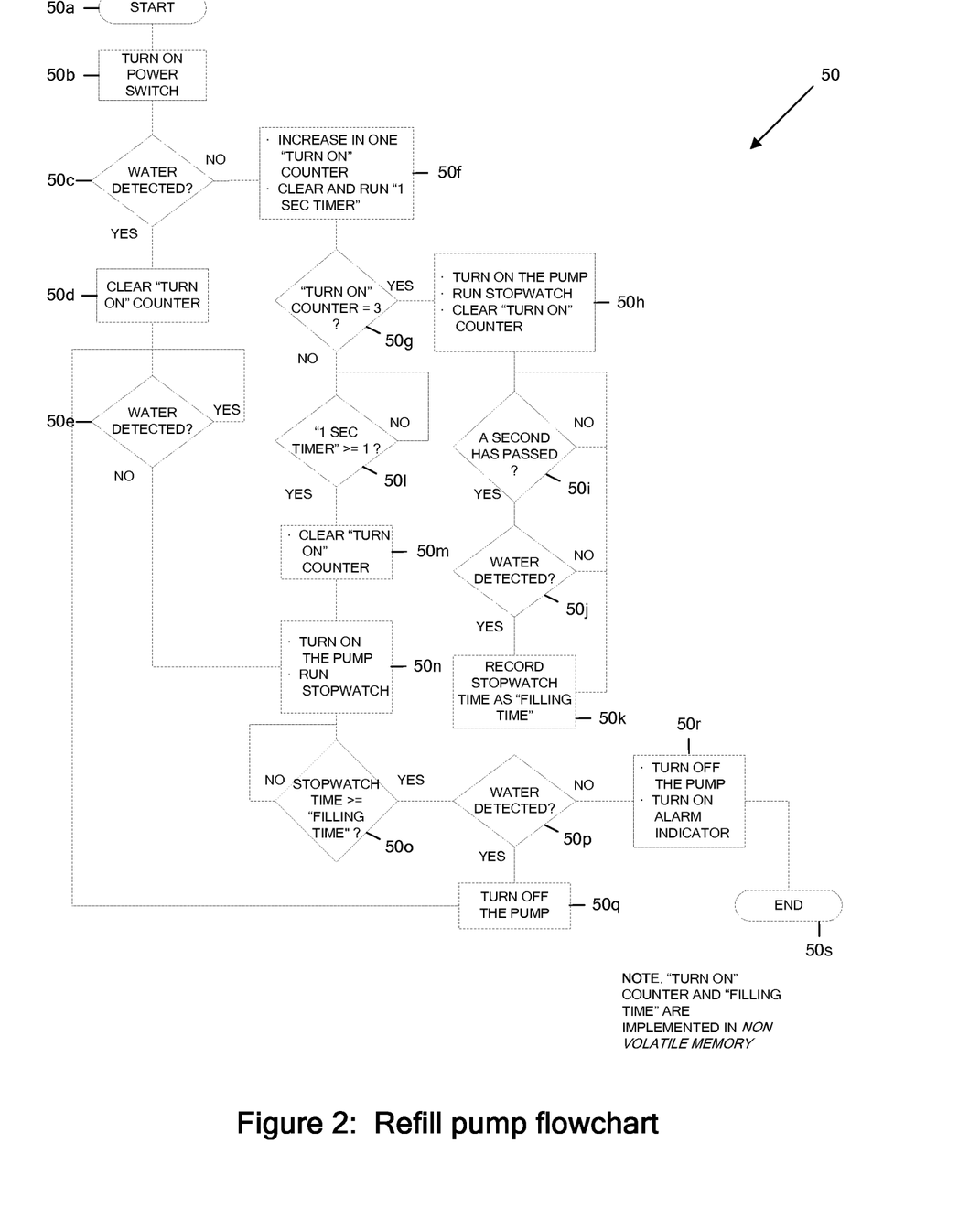
FIG. 2 is a flowchart of steps to implement functionality related to a refill pump, according to some embodiments of the present invention.

During the normal operation, the steps in FIG. 2 may be implemented.

FIG. 2: The Refill Pump Flowchart 50

By way of example, FIG. 2 shows a flowchart generally indicated as 50 of steps 50*a* to 50*s* to implement functionality related to a refill pump, according to some embodiments of the present invention. The flowchart 50 includes start and end steps 50*a* and 50*s*; actions steps 50*b*, 50*d*, 50*f*, 50*h*, 50*k*, 50*m*, 50*n*, 50*q* and 50*r*; and decision making steps 50*c*, 50*e*, 50*g*, 50*i*, 50*j*, 50*l*, 50*o* and 50*p*. A person skilled in the art after reviewing the flowchart 50 in FIG. 2 in conjunction with that disclosed in the patent application as a whole would be able to implement the functionality related to the refill pump without undue experimentation, e.g., in the control PCB 28. By way of example, the control PCB 28 may be configured to implement functions related to a counter, a timer, a stopwatch, etc. in various steps in the flowchart 50. Embodiments are envisioned, and the scope of the invention is intended to include, e.g., implementing the counter, timer or stopwatch functionality in or on the control PCB 28 using either hardware or software configurations. By way of further example, the control PCB 28 may be configured to implement functions related to decision making steps 50*c* and 50*j* and 50*p*, e.g., that may be made in response to the signaling received from the level sensing PCB 26 containing information about the level of liquid in the appliance reservoir.

By way of example, embodiments are envisioned, and the scope of the invention is intended to include using other refill control functionality, e.g., that may take the form of modifications to that shown in FIG. 2, consistent with that which would be appreciated by a person skilled in the art.

Figure 3:
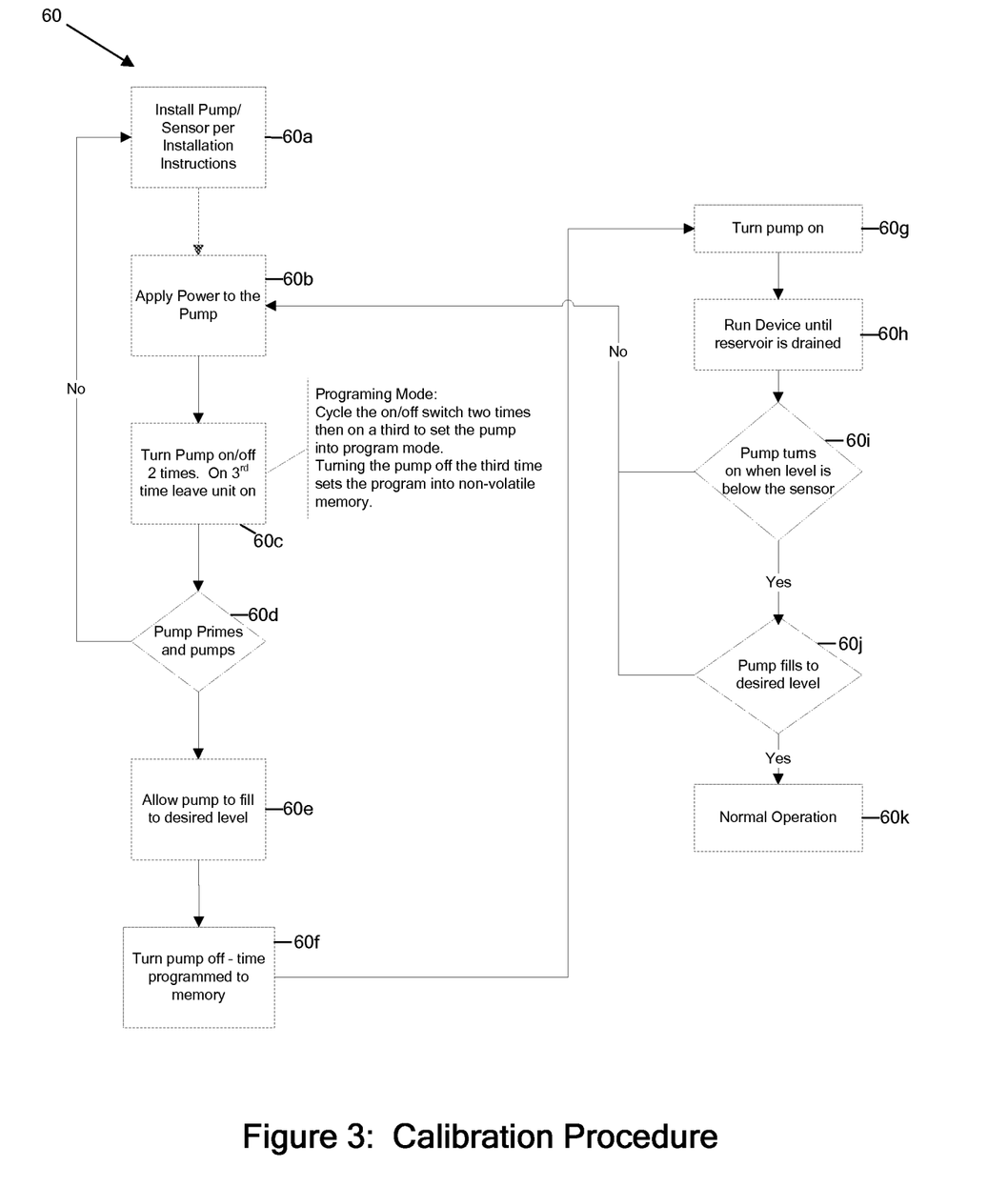
FIG. 3 is a flowchart of steps to implement an appliance reservoir refill level related to a refill pump, according to some embodiments of the present invention.

FIG. 3: An Appliance Reservoir Refill Level Calibration Procedure 60

By way of example, FIG. 3 shows a flowchart generally indicated as 60 of steps 60*a* to 60*k* to implement functionality related to an appliance reservoir refill level calibration procedure, according to some embodiments of the present invention. The flowchart 60 includes start and end steps actions steps 60*a*, 60*b*, 60*c*, 60*e*, 60*f*, 60*g*, 60*h* and 60*k*; and decision making steps 60*d*, 60*i* and 60*j*. A person skilled in the art after reviewing the flowchart 60 in FIG. 3 in conjunction with that disclosed in the patent application as a whole would be able to implement the functionality related to the appliance reservoir refill level calibration procedure without undue experimentation, e.g., in the control PCB 28.

During the calibration procedure, the control PCB 28 may be configured to receive signaling containing information about when the appliance reservoir is refilled based upon an indication that forms part of an appliance reservoir refill level calibration procedure programmed by an appliance user; and to determine corresponding signaling containing information about automatically refilling the liquid in the appliance reservoir, based upon the signaling received. The corresponding signaling may include, or take the form of, programming the control PCB 28 in order to refill the appliance reservoir. For example, the corresponding signal may include, e.g., storing a predetermined low level, storing a pump run time for turning the motor 22 ON/OFF, etc.

During the calibration procedure, the steps in FIG. 3 may be implemented.

In particular, and by way of example, the flowchart 60 includes an action step 60*c* to turn the pump ON/OFF 2 times, and on the 3rd time leaving the pump ON, e.g., to set the pump into the programming mode for the user to program the pump. After the user completes programming mode, turning off the pump the 3rd time sets the program, e.g., by storing it in non-volatile memory. Embodiments are envisioned, and the scope of the invention is intended to include, e.g., turning the pump off a different number of times to set the pump into the programming mode.

By way of example, embodiments are envisioned, and the scope of the invention is intended to include using other calibration functionality, e.g., that may take the form of modifications to that shown in FIG. 3, consistent with that which would be appreciated by a person skilled in the art.

Figure 4A:
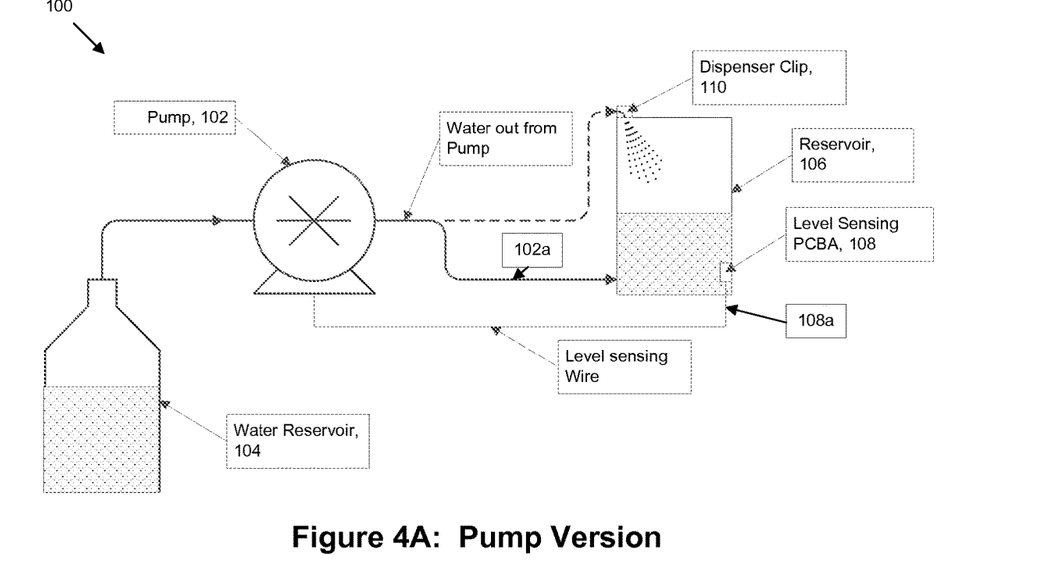
FIG. 4A is a diagram of apparatus in the form of a pump version or embodiment to implement functionality related to a refill pump, according to some embodiments of the present invention.

FIG. 4A: The Pump Version 100

By way of example, FIG. 4A shows apparatus in the form of a pump version or embodiment to implement functionality related to a refill pump, according to some embodiments of the present invention. The apparatus 100 includes a pump 102, a water reservoir 104, a reservoir 106, a level sensing PCBA 108 and a dispenser clip 110, all as shown in FIG. 4A. In operation, the level sensing PCBA 108 senses a low liquid level, and provides suitable signaling along a level sensing line 108*a* to the pump 102, which may be configured with, e.g., the control PCB 28, that implements the control functionality set forth herein, so that the pump 102 provides the liquid from the water reservoir 104 via the supply line 102*a* to the reservoir 106 in order to refill the same.

Figure 4B:
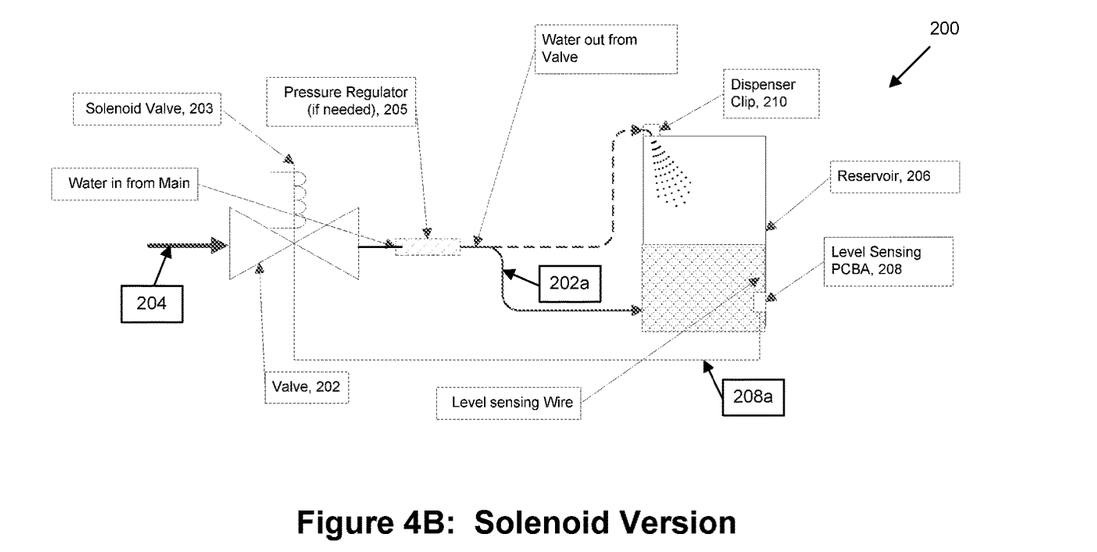
FIG. 4B is a diagram of apparatus in the form of a solenoid version or embodiment to implement functionality related to a refill pump, according to some embodiments of the present invention.

FIG. 4B: The Solenoid Version 200

By way of example, FIG. 4B shows apparatus in the form of a solenoid version or embodiment to implement functionality related to a refill pump, according to some embodiments of the present invention. The apparatus 200 includes a valve 202, a solenoid valve 203, piping for receiving water from the mains, a pressure regulator 205, a reservoir 206, a level sensing PCBA 208 and a dispenser clip 210. In operation, the level sensing PCBA 208 senses a low liquid level, and provides suitable signaling along a level sensing line 208*a* to the solenoid valve 203, which may be configured with, e.g., the control PCB 28, that implements the control functionality set forth herein, such that the valve 204 provides the liquid (in the form of water from the mains) from the piping 204 via the supply line 202*a* to the reservoir 206 in order to refill the same.

The pressure regulator 205 may be used, if needed, in order to regulate the pressure of the liquid (in the form of water from the mains) from the piping 204 via the supply line 202*a* to the reservoir 206 in order to refill the same.

Figure 5:
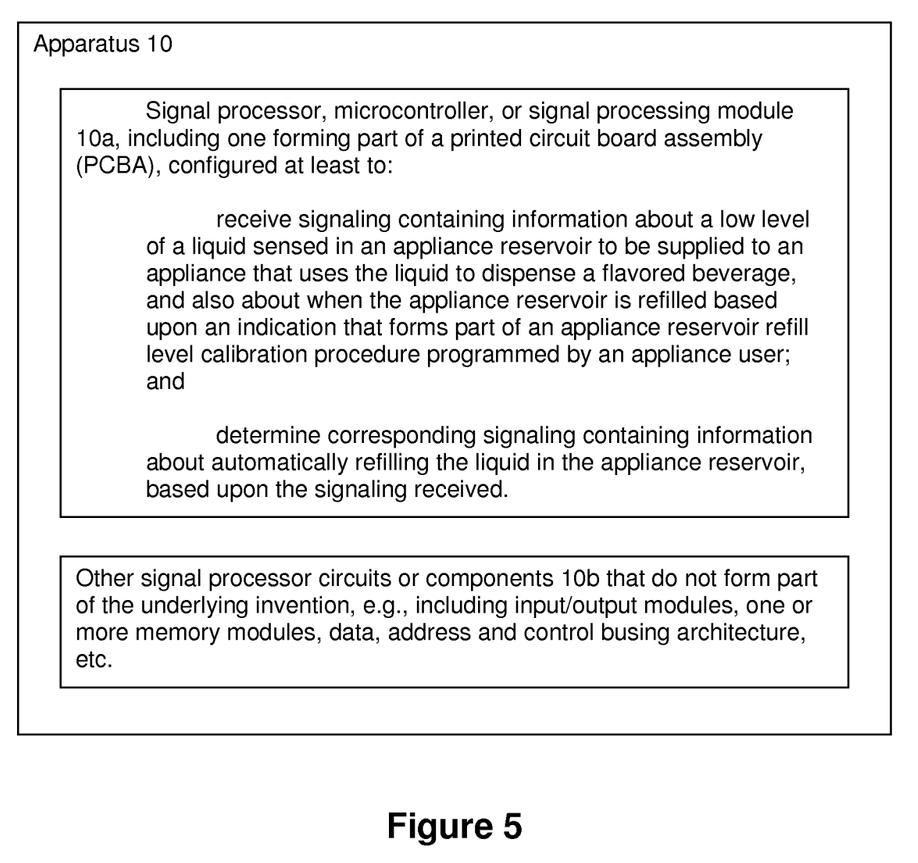
FIG. 5 is a block diagram of a signal processor, microcontroller, or signal processing module configured to implement the signal processing functionality, according to some embodiments of the present invention.

FIG. 5: Signal Processor, Microcontroller, or Signal Processing Module 10*a*

By way of example, FIG. 5 shows the present invention in the form of apparatus 10, e.g., having a signal processor, microcontroller, or signal processing module 10*a*.

The signal processor, microcontroller, or signal processing module 10*a* may be configured at least to receive signaling containing information about a low level of a liquid sensed in an appliance reservoir to be supplied to an appliance that uses the liquid to dispense a flavored beverage, and also about when the appliance reservoir is refilled based upon an indication that forms part of an appliance reservoir refill level calibration procedure programmed by an appliance user, and determine corresponding signaling containing information about automatically refilling the liquid in the appliance reservoir, consistent with that set forth herein. The signal processor or signal processing control module 10*a* may include, or form part of, e.g., the control PCB 28, e.g., shown in FIG. 1.

The scope of the invention is intended to include the signal processor, microcontroller, or signal processing module 10*a* as a stand alone module or processor, as well as the signal processor, microcontroller, or signal processing module 10*a* forming part of a PCBA, or as part of some other signal processing module either now known or later developed in the future, etc.

Signal Processor 10*a*

By way of example, and consistent with that described herein, the functionality of the signal processor, microcontroller, or signal processing module 10*a* may be implemented to receive the signaling, process the signaling therein and/or determine the corresponding signaling, e.g., using hardware, software, firmware, or a combination thereof, although the scope of the invention is not intended to be limited to any particular embodiment thereof. In a typical software implementation, the signal processor, microcontroller, or signal processing module 10a, may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor as either part of the aforementioned apparatus, as a stand alone module, or in the combination with other components and/or circuitry for implementing another module.

By way of example, techniques for receiving signaling in such a signal processor, microcontroller, or signal processing module are known in the art, and the scope of the invention is not intended to be limited to any particular type or kind thereof either now known or later developed in the future. Based on this understanding, a person skilled in the art would appreciate, understand and be able to implement and/or adapt the signal processor, microcontroller, or signal processing module without undue experimentation so as to receive the signaling containing information about the low level of the liquid sensed in the appliance reservoir to be supplied to the appliance that uses the liquid to dispense the flavored beverage, and also about when the appliance reservoir is refilled based upon the indication that forms part of the appliance reservoir refill level calibration procedure programmed by an appliance user, consistent with that set forth herein.

Techniques for determining one type of signaling based upon, or from, another type signaling received are also known in the art, and the scope of the invention is not intended to be limited to any particular type or kind thereof either now known or later developed in the future. Based on this understanding, a person skilled in the art would appreciate, understand and be able to implement and/or adapt the signal processor, microcontroller, or signal processing module without undue experimentation so as to determine corresponding signaling containing information about automatically refilling the liquid in the appliance reservoir, e.g., based upon the signaling received, consistent with that set forth herein.

Techniques for providing signaling from a signal processor such as module 10a are also known in the art, and the scope of the invention is not intended to be limited to any particular type or kind thereof either now known or later developed in the future. Based on this understanding, a person skilled in the art would appreciate, understand and be able to implement and/or adapt the signal processor, microcontroller, or signal processing module without undue experimentation so as to provide the corresponding signaling containing information about automatically refilling the liquid in the appliance reservoir, consistent with that set forth herein.

It is also understood that the apparatus 10 may include one or more other signal processor circuits or components 10b for implementing other functionality associated with the underlying apparatus that does not form part of the underlying invention, and thus is not described in detail herein. By way of example, the one or more other modules, components, processing circuits, or circuitry may include random access memory, read only memory, input/output circuitry and data and address buses for use in relation to implementing the signal processing functionality of the signal processor, or devices or components, etc.

List of Possible Applications

Possible applications may include using the present invention in conjunction with any refilling of liquids, not limited per se to flavored beverages. For example, this could include using the present invention in conjunction with either tea, coffee, juice, or industrial applications where one reservoir is filled by removing liquid from another reservoir, etc.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An appliance system comprising:
   an appliance reservoir configured to contain liquid for dispensing in an appliance; and
   an appliance reservoir refill controller having
      a memory configured to receive and store appliance user programmed signaling containing information about an appliance user calibrated appliance reservoir filling time, which is a programmed time period to refill liquid in the appliance reservoir that is input by an appliance user implementing an appliance reservoir refill level calibration procedure programmed in the appliance reservoir refill controller and that corresponds to an appliance user calibrated liquid refill level; and
      a signal processor, microcontroller, or signal processing module configured at least to:
         receive sensed signaling containing information about a low level of a liquid sensed in the appliance reservoir, and the appliance user programmed signaling; and
         determine corresponding signaling containing information to control automatically the refilling of the liquid in the appliance reservoir, based upon the appliance user programmed signaling and the sensed signaling received.

2. An appliance system according to claim 1, wherein the signal processor, microcontroller or signal processing module is configured to provide the corresponding signaling containing information for automatically refilling the liquid in the appliance reservoir to turn a refill pump on and off for automatically refilling the liquid in the appliance reservoir.

3. An appliance system according to claim 1, wherein the signal processor, microcontroller, or signal processing module is configured to respond to a user programming mode input, implement the appliance reservoir refill level calibration procedure, and store in the memory the appliance user calibrated appliance reservoir filling time for turning a pump motor ON/OFF, including where an appliance user input is provided as an input in response to the appliance visually seeing and determining that the appliance reservoir is refilled.

4. An appliance system according to claim 1, wherein the appliance system comprises automatic refilling equipment having either a combination of a refill pump and appliance reservoir, or a solenoid coupled to a water mains, the automatic refilling equipment being configured with the signal processor, microcontroller, or signal processing module to respond to the corresponding signaling and provide the liquid to refill the appliance reservoir.

5. An appliance system according to claim 1, wherein the appliance system comprises a control printed circuit board (PCB) that forms part of a refill pump.

6. An appliance system according to claim 1, wherein the appliance system comprises, or takes the form of, a programmable refill pump having a motor, a pump head and a control printed circuit board having the signal processor, microcontroller, or signal processing module for implementing signal processing functionality of the programmable refill pump.

7. An appliance system according to claim 1, wherein the appliance reservoir is configured with a level sensing printed circuit board (PCB) for sensing a liquid level and providing a low level sensor signal.

8. An appliance system according to claim 1, wherein the appliance user calibrated liquid refill level includes a calibrated high liquid refill level containing information that the appliance reservoir is refilled.

9. An appliance system according to claim 8, wherein the signal processor, microcontroller or signal processing module is configured to implement the appliance reservoir refill level calibration procedure, respond to the calibrated high liquid refill level, and determine the amount of time required for running a refill pump for refilling the appliance reservoir.

10. An appliance system according to claim 1, wherein the appliance system comprises a level sensing printed circuit board (PCB) configured to sense the low level of the liquid in the appliance reservoir, and provide the sensed signaling received by the signal processor, microcontroller, or signal processing module to control automatically the refilling of the liquid in the appliance reservoir.

11. An appliance system according to claim 10, wherein the level sensing printed circuit board (PCB) is configured using capacitive-based sensing that is not in contact with the liquid in the appliance reservoir.

12. An appliance system according to claim 1, wherein the signal processor, microcontroller, or signal processing module is configured to implement the appliance reservoir refill level calibration procedure by:
running a refill pump and draining the appliance reservoir until the low level of the liquid is sensed in the appliance reservoir;
running the refill pump and providing the liquid from a main reservoir to the appliance reservoir until a high level of the liquid is sensed in the appliance reservoir;
determining the amount of time to refill the liquid in the appliance reservoir; and
storing the amount of time to run the refill pump to refill the liquid in the appliance reservoir, including where the amount of time is stored in a non-volatile memory on a control printed circuit board (PCB).

13. An appliance system according to claim 12, wherein the signal processor, microcontroller, or signal processing module is configured to implement a timeout feature in order to prevent overfilling of the appliance reservoir when refilled.

14. An appliance system according to claim 12, wherein the appliance system comprises the refill pump, the control printed circuit board (PCB) and a level sensing printed circuit board arranged on the appliance reservoir.

15. A method for refilling an appliance reservoir in an appliance system, comprising:
receiving and storing, in a memory, appliance user programmed signaling containing information about an appliance user calibrated appliance reservoir filling time, which is a programmed time period to refill liquid in an appliance reservoir that is input by an appliance user implementing an appliance reservoir refill level calibration procedure programmed in an appliance reservoir refill controller and that corresponds to an appliance user calibrated liquid refill level;
receiving, in the appliance reservoir refill controller having a signal processor, microcontroller, or signal processing module, sensed signaling containing information about a low level of a liquid sensed in an appliance reservoir, and the appliance user programmed signaling; and
determining, with the signal processor, microcontroller, or signal processing module, corresponding signaling containing information to control automatically the refilling of the liquid in the appliance reservoir, based upon the appliance user programmed signaling and the sensed signaling received.

16. A method according to claim 15, wherein the method comprises: providing with the signal processor, microcontroller or signal processing module the corresponding signaling containing information for automatically refilling the liquid in the appliance reservoir to turn a refill pump on and off for automatically refilling the liquid in the appliance reservoir.

17. A method according to claim 15, wherein the method comprises responding to a user programming mode input, implementing the appliance reservoir refill level calibration procedure, storing in the memory the appliance user calibrated appliance reservoir filling time for turning a pump motor ON/OFF, including where the appliance user input is provided as an input in response to the appliance user visually seeing and determining that the appliance reservoir is refilled.

18. A method according to claim 15, wherein the appliance user calibrated liquid refill level includes a calibrated high liquid refill level containing information that the appliance reservoir is refilled.

19. A method according to claim 15, wherein the method comprises:
using automatic refilling equipment having either a combination of a refill pump and appliance reservoir, or a solenoid coupled to a water mains, the automatic refilling equipment being configured with the signal processor, microcontroller, or signal processing module to respond to the corresponding signaling and provide the liquid to refill the appliance reservoir.

20. An appliance system, comprising:
an appliance reservoir configured to contain liquid for dispensing in an appliance;
a level sensing printed circuit board assembly arranged on to a liquid reservoir, configured to sense a level of liquid in a liquid reservoir being supplied to a dispenser for dispensing a tea, coffee or juice, and provide sensed signaling containing information about the level of liquid in the liquid reservoir, the level sensing printed circuit board assembly configured using capacitive-based sensing that is not in contact with the liquid in the liquid reservoir; and an appliance reservoir refill controller having
- a memory configured to receive and store appliance user programmed signaling containing information about an appliance user calibrated appliance reservoir filling time, which is a programmed time period to refill the liquid in an appliance reservoir that is input by an appliance user implementing an appliance reservoir refill level calibration procedure programmed in the appliance reservoir refill controller and that corresponds to an appliance user calibrated liquid refill level; and
- a signal processor, microcontroller, or signal processing module configured at least to:
  - receive the sensed signaling containing information about the level of the liquid sensed in the liquid reservoir, and the appliance user programmed signaling; and
  - determine corresponding signaling containing information to control automatically the refilling of the liquid in the liquid reservoir, based upon the appliance user programmed signaling and the sensed signaling received.

\* \* \* \* \*